Fig. 1.

INVENTORS
ROBERT S. SINN &
GEORGE W. HERNAN
BY
ATTORNEY

INVENTORS
ROBERT S. SINN &
GEORGE W. HERNAN
BY *Morton C. Jacobs*
ATTORNEY

United States Patent Office 3,283,304
Patented Nov. 1, 1966

3,283,304
DATA RETRIEVAL SYSTEM
Robert S. Sinn, Philadelphia, Pa., and George W. Hernan, Haddonfield, N.J., assignors to Ultronic Systems Corp., Pennsauken, N.J., a corporation of Delaware
Continuation of application Ser. No. 113,689, May 31, 1961. This application Aug. 20, 1965, Ser. No. 484,784
16 Claims. (Cl. 340—152)

This application is a continuation of application Serial No. 113,689, filed May 31, 1961, and now abandoned.

This invention relates to data storage systems and particularly to an associated system for retrieving information about stock transactions which is stored in such a system.

This invention is concerned with a data storage system for storing stock transaction information in a form in which the information can be readily selected by an operator in a stock broker's office or the like. The information is stored in a storage system that may be quite remote from the stock broker's office, and controls are provided for obtaining access to the storage from a large number of requesting offices, all or some of which may be quite remote. The requested information is made available to the requesting operator almost immediately upon selection of the desired stock and category of information. A system in accordance with this invention permits a large number of operators to gain access to the central storage system substantially simultaneously and from remote locations.

Accordingly, it is an object of this invention to provide a now and improved data retrieval system.

Another object is to provide a new and improved data retrieval system for supplying current information about stock transactions.

Another object is to provide a new and improved data storage system for furnishing stock transaction data to requesting parties substantially simultaneously and from remote locations.

Another object is to provide a new and improved data transmission and synchronizing system so that digital equipment at remote locations may be operated in substantial synchronism.

In an embodiment of this invention, a cyclic memory such as a magnetic drum is connected to a plurality of data retriever devices, all of which may obtain simultaneous access to the memory for read-out of information at selected locations. Associated with each data retriever is a data transmission and receiving system and a terminal switching system at a remote location. A plurality of manually operable consoles are connected to the terminal switching equipment for transmission via the transmission system of signals identifying the stock for which information is requested and for receipt of the reply therefrom of signals representing the requested information.

The foregoing and other objects of this invention, the features thereof, as well as the invention itself, may be more fully understood from the following description when read together in connection with the accompanying drawing, in which:

FIG. 3b is a schematic block diagram of another portion of the data retriever of FIG. 3a;

FIG. 5 is a schematic block diagram of a synchronizer that may be used in the system of FIG. 3a;

In the drawing, corresponding parts are referenced by similar numerals.

Figure 1:
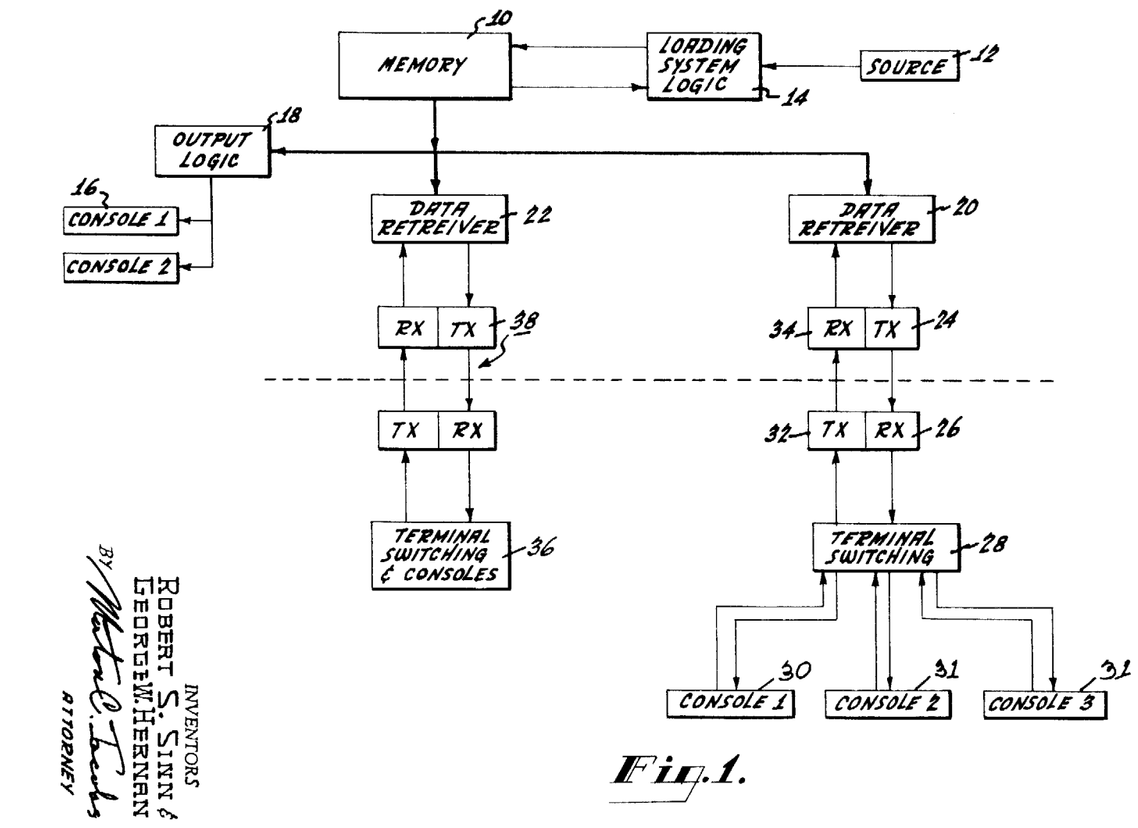
FIG. 1 is a schematic block diagram of an information storage and retrieval system embodying this invention.

In FIG. 1, a storage drum memory 10 receives information from a source 12 via a loading system and control 14. A suitable arrangement of this sort is described in the copending application, "Information Storage System," Serial No. 108,120, filed May 5, 1961.

Information stored in the memory 10 is supplied to a plurality of manually operable consoles 16 via an output logic 18, a suitable form of which is described in the copending application, "Data Storage System," Serial No. 102,882, filed April 13, 1961. The information signal busses connected via the output logic 18 to the console 16 is also connected to a plurality of data retriever devices 20 and 22. The data retriever 20 is connected via a communication line that includes an associated transmitter Tx 24 to the receiver Rx 26 associated with a terminal switching system 28; the latter is connected to a plurality of consoles 30 and 31. The consoles 30 and 31 request information via the terminal switching logic 28 and associated Tx 32 connected to Rx 34 of the data retriever 20.

The communication system 24, 26, and 32, 34 may be of any suitable type; an appropriate form of which is a commercially available dataphone communication system for transmitting digital information via a telephone using a frequency modulation system. For example, signals of two different frequencies are generated and transmitted in response to high and low voltage levels, respectively, which represent the binary digits "0" and "1." The Tx units 24 and 32 convert digital signals in the form of voltage levels from the data retriever 20 and 28 to the signals of different frequencies, and the Rx units reconvert the transmitted signals back to the appropriate voltage levels. The data retriever 22 is similarly connected via transmitters and receivers in a dataphone communication system 38 to terminal switching and consoles 36.

In operation, any of the consoles 30 and 31 requests information stored in the drum 10 in a message sent by way of the terminal switches 28, the transmitter 32 and receiver 34, and the data retriever 20. The retriever 20 obtains the information from the drum 10 and returns it in an answering message via Tx 24 and Rx 26 and the terminal switching 28 to the requesting one of the consoles 30. The data retriever 22 has access to the storage drum 10 at the same time as the data retriever 20. Thereby, the consoles 36 may be obtaining access to the storage drum 10 (to the same or different parts thereof) at the same time as the consoles 30. Likewise, the consoles 16, which may be located relatively close to the storage drum 10, as contrasted to the remote locations of the consoles 30 and 36, may obtain access to the storage drum 10 via a data retriever in the form of the output logic 18 at the same time as the retrievers 20 and 22.

Figure 2:
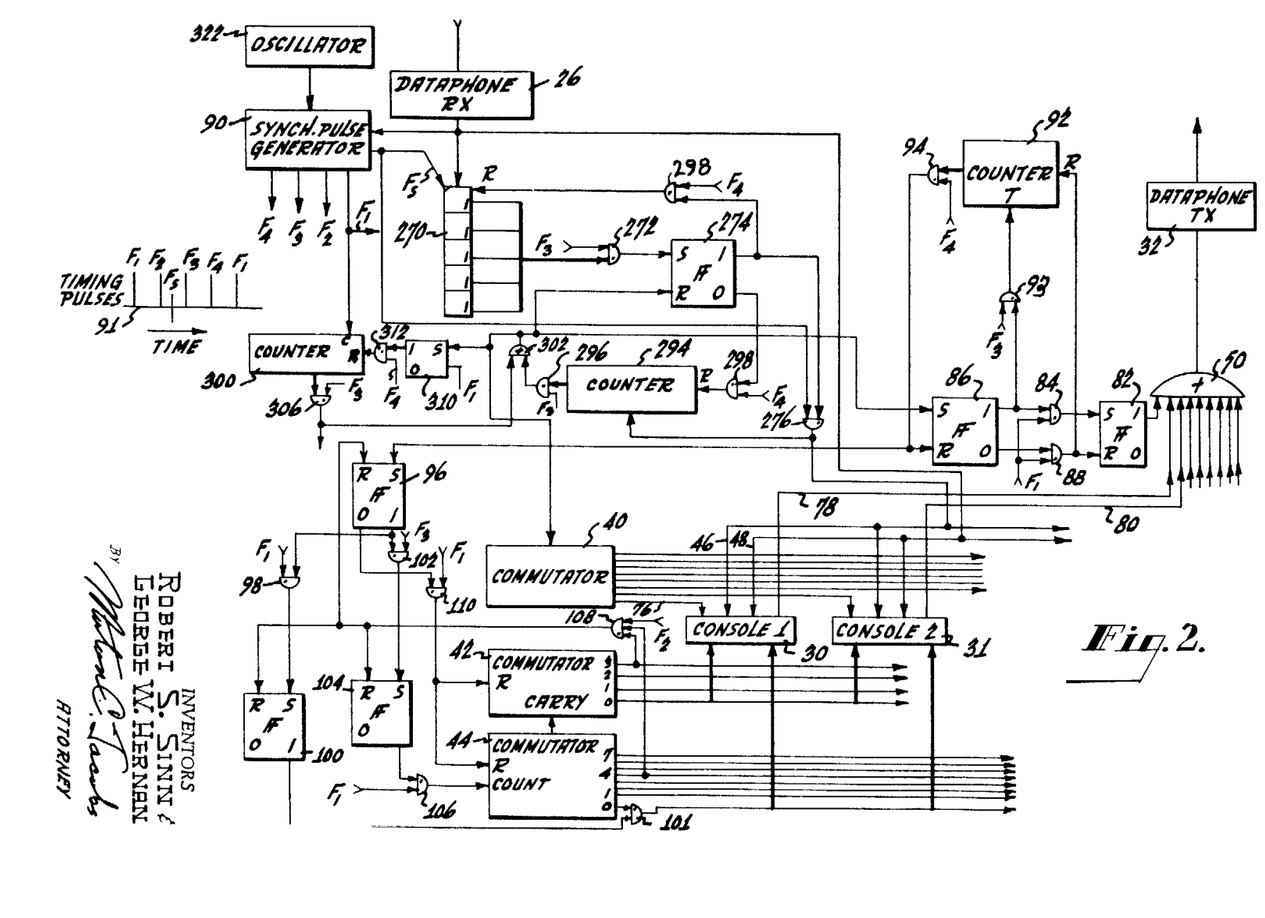
FIG. 2 is a schematic block diagram of terminal equipment that may be used in connection with the system of FIG. 1.

In FIG. 2, details of the terminal switching equipment 28 are shown together with two consoles 30 and 31. The system of FIG. 2 contemplates the use of eight such consoles 30 and 31 operating together substantially simultaneously under the control of a commutator 40 which has eight outputs respectively connected to the eight consoles 30 and 31. These members are merely illustrative and more consoles may be accommodated.

Two other commutators 42 and 44 are also used to control the timing of the consoles 30. The commutator 42 has four lines, each of which is connected to each of the consoles 30 (the four lines are represented by a single heavier line for simple illustration); and the commutator 44 has eight output lines, each of which is also connected to each of the consoles 30. Other inputs to the consoles 30 are a shift line 46 and an information bus 48. The output lines 78 and 80 of all the consoles 30 and 31 are connected via a buffer 50 to the dataphone $Tx$ 32.

Figure 4:
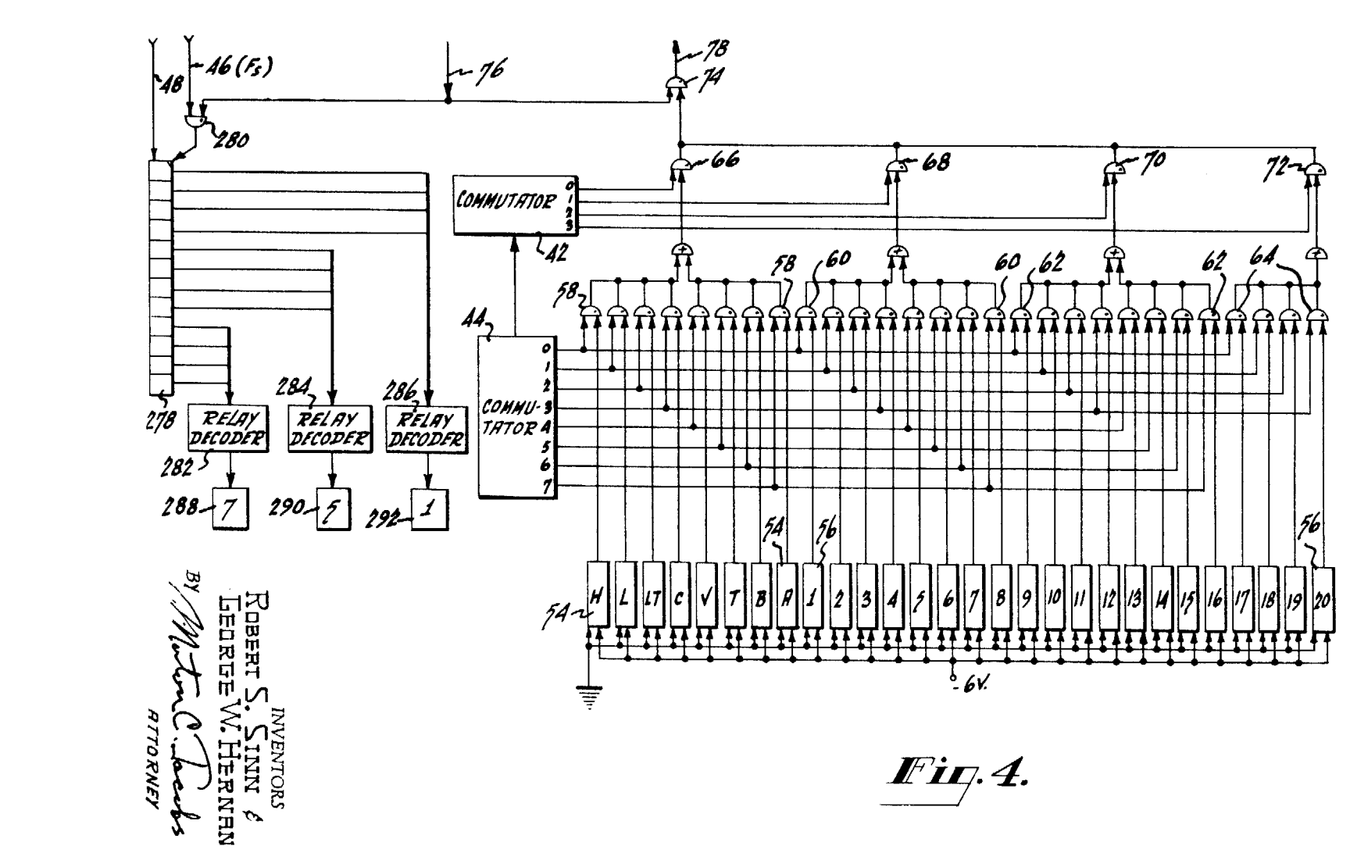
FIG. 4 is a schematic block diagram of the switching connections from one console in the system of FIG. 2.

In FIG. 4 an arrangement of the first console 30 is shown under control of the commutators 42 and 44. Each of the other consoles is similarly constructed. A plurality of manually operable switches 54 represents different types of information of stock transactions such as High, Low, Last, Close, Volume, Trades, Bid, and Ask, and are used to develop representative signals. In addition, a set of manually operable switches 56 (twenty such switches) are used to establish signals for a stock identification code combination to select the desired stock. The switches 54 and 56 each have two fixed contacts therein (not shown) to which are respectively connected different voltage levels such as ground potential and —6 volts, respectively representing binary digits "0" and "1". These switches 54 and 56 in their normal unactuated conditions furnish, for example, a ground potential at the output connection thereof and in the actuated condition —6 volts at that output line. These potentials are used to represent the binary digits "0" and "1" respectively throughout the logic. Suitable key actuated switch arrangements for manual operation are known in the art. The patent application, "Data Selection System" of Robert S. Sinn, Serial No. 113,690, filed concurrently herewith describes a suitable selector switch system.

The eight output lines of the commutator 44 are used as inputs to a first set of eight gates 58 which respectively receive as their other inputs the outputs of the switches 54. The commutator lines are also connected to a second group of eight gates 60 which receive as their second inputs the output connections from the #1–8 switches 56. Gates 62 receive the eight commutator outputs respectively as well as the output connections from #9–16 switches 56. The four gates 64 receive the first four lines from the commutator 44, respectively, as well as those from the last four switches 56 (#17–20).

The gates 58 are connected via a buffer to another gate 66 which also receives the first output of commutator 42. The gates 60 are connected via a buffer to a gate 68, the gates 62 to a gate 70, and the gates 64 to a gate 72. The second, third, and fourth commutator outputs are respectively connected to the gates 68, 70, and 72. The outputs of the gates 66–72 are connected via a buffer represented by the common connection thereat to a gate 74 which receives a switching line 76 from the commutator 40.

The commutator 44 includes a 3-stage binary counter to provide a count of 8, and its output is connected as a carry to the input of commutator 42 which includes a 2-stage binary counter cycling through a count of 4. Thus, the commutator 42 counts the successive cycles of the commutator 44.

In operation, the commutator 44 gates the settings of the switches 54 and 56 through the gates 58–64 in successive groups of eight (except for the smaller group of four gates 64), and the commutator 42 gates the outputs of the groups of gates 58, 60, 62, and 64 successively through the gates 66, 68, 70, and 72. This commutator arrangement develops a serial signal train of voltage levels for the settings of the twenty-eight switches 54 and 56, which are supplied to the gate 74. When the gate 74 is enabled by the line 76, the train of twenty-eight switch signals are passed by that gate 74 to the output connection 78, which is connected via the buffer 50 to $Tx$ 32 as shown in FIG. 2. The output connection 80 of the console 2 (which operates in a fashion similar to that described for console 1) likewise transfers a serial train of signals via the buffer 50 to the $Tx$ 32 when the associated output line of commutator 40 carries a gate-enabling signal.

The 1-output of a flip-flop 82 is also connected via the buffer 50 to $Tx$ 32. This flip-flop 82 is set via a gate 84 from the 1-output of another flip-flop 86. The 0-output of flip-flop 86 is also connected to a gate 88 which is pulsed by F–1 synchronizing signals from synchronizing pulse generator 90. The timing signals F–1 to F–4 are periodically generated in repeated cycles of equally spaced pulses as indicated by the timing diagram 91 next to the generator 90.

The 1-output of FF–86 is also supplied to a 2-stage binary counter 92 at the counting input thereof. The count of 2 in the counter 92 is detected by means of a gate 94 pulsed by F–4 sync pulses, and the output of this gate is used to reset the flip-flop 86. The 0-output of flip-flop 86 is gated through gate 88 to reset flip-flop 82 and to reset counter 92. The output of gate 94 is also connected to set flip-flop 96, the 1-output of which enables gate 98 for F–1 sync pulses to set flip-flop 100. The 1-output of the latter 100 is used to enable a gate 101 to connect the 0-count output line of commutator 44 to the consoles 30 and 31.

The 1-output of flip-flop 96 is also applied to a gate 102 that is pulsed by F–3 sync pulses to set flip-flop 104, the 1-output of which is used to enable gate 106 to pass successive F–1 sync pulses to the count input of commutator 44. The combined count of 28 for the commutators 44 and 42, which occurs upon the reading out of the last of the switches 54 and 56, is detected by gating together in gate 108 the #3 output line of commutator 42 with the #4 output of commutator 44 (which respectively represent counts of 24 and 4, making a total count of 28. Gate 108 passes sync pulse F–2 to reset flip-flops 100, 104, and 96, and the 0-output of flip-flop 96 is gated by an F–1 pulse in gate 110 to reset the commutators 42 and 44.

In operation, when FF–86 is set, FF–82 is also set by the next F–1 sync pulse. Two cycles of the synchronizing pulses in the form of F–3 are counted by counter 92, whereupon the next F–4 resets FF–86, and the next F–1 resets FF–82. The 1-output of FF–82 generates space signals (representing binary 1) that are supplied to the $Tx$ 32 for two cycles of the F–1 sync pulses.

When FF–86 is reset, FF–96 is set and FF–100 is also set so that gate 101 passes the gate-enable signal on the 0-output line of commutator 44 to the consoles 30 and 31. Assuming commutator 40 is in the 0-state at that time, a selecting signal train from console 30 is generated on line 78 and is supplied via buffer 50 to $Tx$ 32 starting immediately after the resetting of FF–82; that is with commutators 40, 42, and 44 all starting out from the reset or the 0-count condition, the setting of "High" switch (FIG. 4) is passed by gate 58 and gates 66 and 74 to the console output line 78 and then to the $Tx$ 32.

The setting of FF–96 results in FF–104 being set towards the end of that sync pulse cycle by F–3 so that the next F–1 is supplied to commutator 44 to step it to the 1-state. With the commutator 44 stepped to the 1-state, the setting of the "Low" switch 54 is next supplied to the $Tx$ 32. In a similar fashion, successive F–1 pulses step the commutator 44 through its cycle to pass signals to the Tx 32 representing successively the respective states of the remaining switches 54.

After the first counting cycle of the commutator 44, a carry is passed to commutator 42 to step it to the 1-state which, in turn, enables the gate 68 to pass the settings of the SIC switches #1–8. In a similar fashion, during the third cycle of commutator 44, the gate 70 is enabled to pass the settings of SIC switches #9–16; and during the first half of the fourth cycle of commutator 44, the settings of switches #17–20 are passed successively via gates 64 and 72 to the Tx 32. At that time, the gate 108 is enabled to pass the succeeding F–2 pulse to reset FF–96, –100, and –104, and the next F–1 pulse resets commutators 43 and 44 to their 0-count states; thereby, gate 101 is disabled so that all of the gates 58–64 of each console 30 and 31 are closed.

Figure 3A:
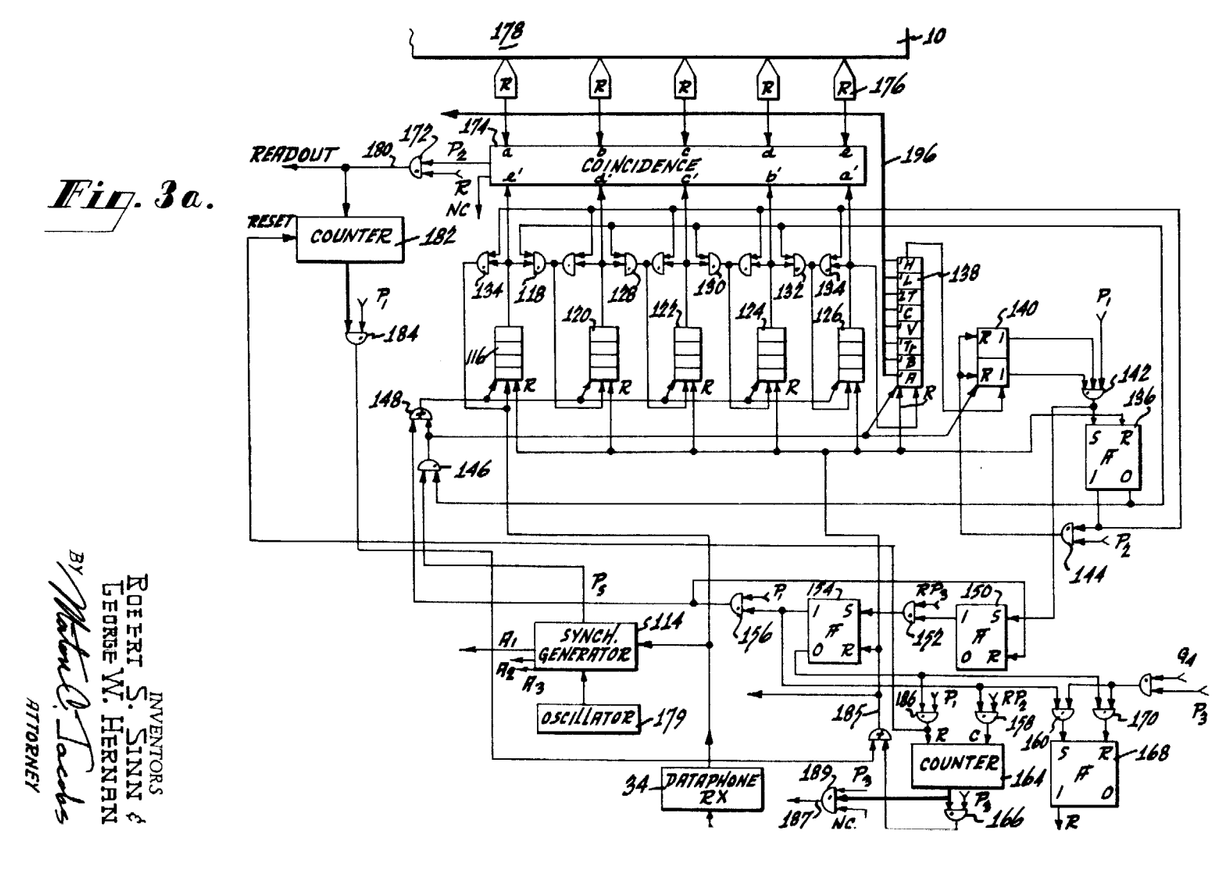
FIG. 3a is a schematic block diagram of a data retriever device and associated equipment that may be used in connection with the system of FIG. 1.
Figure 7:
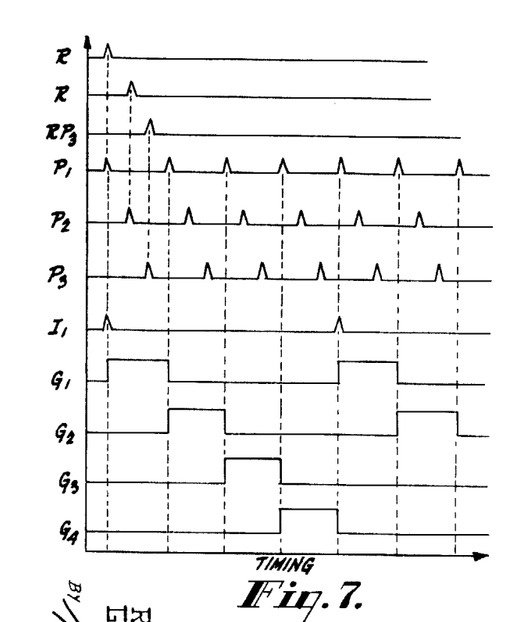
FIG. 7 is a schematic graphical diagram showing the time relations of waveforms occurring in the system.

In FIG. 3a, the data retriever logic is connected to the dataphone Rx 34 to receive the transmitted signals from the Tx 32 in FIG. 2. The Rx 34 converts the signals and supplies them in appropriate form for use in the logic. The output of Rx 34 is supplied to a synchronizer generator 114 and also to the first stage of a 4-stage shift register 116. The fourth stage of register 116 is connected via a gate 118 to the first stage of a second 4-stage register 120. Three other shift registers 122, 124, and 126 are connected in cascade by way of the gates 128, 130, and 132. The registers 116, 120, 122, 124, and 126 are also connected to operate as individual circulating registers by means of gates 134 connected between their respective last and first stages. The gates 118, 128, 130, and 132 are enabled by the 0-output of a flip-flop 136, the 1-output of which is used to enable the circulating gates 134.

The fourth stage of shift register 126 is connected to the first stage of an 8-stage shift register 138, the last stage of which is connected to the first stage of a 2-stage register 140. The 1-outputs of the two stages 140 are gated together with a P–1 timing pulse (derived from timing source 162, and shown in FIG. 7 in gate 142 to set flip-flop 136. The 1-output of flip-flop 136 is used to gate P–2 pulses through gate 144 to reset the stages 140.

The P–3 output of the synchronizer generator 114 is used as a shift pulse and is passed by gate 146 (enabled by the 0-output of flip-flop 136) to provide shift pulses for the registers 138 and 140 and also via the buffer 148 for the registers 116 and 120–126. The output of gate 142 is also used to gate a flip-flop 150, the 1-output of which is used to gate an RP–3 signal via gate 152 to set flip-flop 164. The 1-output of flip-flop 154 is gated with P–1 pulses in gate 156 to reset FF–150 and to supply shift pulses to the buffer 148 for the circulating shift registers 116, 120, 122, 124, and 126.

The 1-output of flip-flop 154 is also used to enable gates 158 and 160; the gate 158 passes RP–2 pulses to a counting input of 3-stage binary counter 164. The gate 166 detects a count of 5 in the counter 164 to pass a timing pulse P–3 to reset FF–154. When FF–154 is reset, the next P–1 pulse resets counter 164 via gate 186. The gate 160 passes P–3 pulses occurring in the G–4 bit position (FIG. 7) to set flip-flop 168. FF–168 is reset via gate 170 when FF–154 is reset.

The 1-output of FF–168 is used as an enabling signal R for gate 172 at the output of a coincidence logic 174. The coincidence 174 includes a logic similar to that described in the aforementioned copending patent application, "Data Storage System" and is used to detect the coincidence of a plurality of signals read from the data storage drum 10 in parallel via reading heads 176 for five tracks of the drum in the bin 178 that includes the SIC signals. An arrangement of these SIC signals in the bin 178 is shown in the drum format diagram of FIG. 6. The signals derived on the five tracks of bin 178 are represented as $a-e$. Also supplied to the coincidence logic 174 are the signals $a'-e'$ derived respectively from the registers 126, 124, 122, 120, and 116. The coincidence 174 compares the twenty bits in the latter registers in four groups of five bits $a'-e'$ with four similar groups of $a-e$ until coincidence of all twenty bits is found.

The sync generator 114 is similar to that described in the aforementioned copending application, "Information Storage System" and is effective to supply P–3 pulses to the gate 146 at a rate substantially the same as the rate of transmission of the dataphone communication 32 and 34 (which may be assumed to be a 1 kilocycle rate). These P–3 pulses from synchronizer generator 114 occur approximately at the center of each bit position in the signal train transmission derived from the dataphone Rx 34. The synchronizer generator 114 includes a recycling 5-stage binary counter for counting pulses supplied by the oscillator 179 at a 32 kc. rate. The other outputs A–1, A–2, and A–3 of the synchronizer 114 are derived at suitable counts such as 0, 10, and 20.

When FF–136 is reset, gate 146 is enabled by the 0-output thereof to pass the P–3 pulses from sync generator 114 and supply them to the registers 116, 120–126, 138, and 140 as shift pulses for those registers. Initially, it is assumed that all of the aforementioned registers are in reset condition. The first four bits supplied by Rx 34 are established successively in the four stages of register 116. Since gate 118 is enabled by the 0-output of FF–136, the next four bits received by Rx 34 are also established in register 116, and the first four bits are shifted into register 120. This operation is continued until the first thirty bits received by Rx 34 are established in the thirty serial stages that make up registers 140, 138, 126, 124, 122, 120, and 116.

At that time, the bits in the stages of register 140 are binary 1's (as explained above in connection with FIG. 2) as a consequence of FF–82 being in set condition for two transmission time periods immediately prior to the conversion of the settings of the console switches to a serial train of signals. Since all of the registers 116, 120, 122, 124, 126, 138, and 140 were assumed to be reset prior to the transmission from Rx 34, the condition of register 140 having 1's in its two stages, represents the beginning of the message from the terminal switching 28 and the establishment in the registers 116, 120, 122, 124, 126, and 138 of the signals representing the states of the switches 54 and 56 of the requesting console 30. This condition is detected by gate 142 and the first P–1 timing pulse thereafter which sets FF–136 and FF–150. When FF–136 is set, successive P–2 pulses are passed by gate 144 to reset register stages 140 and keep them reset. The 1-output of FF–136 also enables circulating gates 134 associated with the shift registers 116 and 120–126. The 0-output of FF–136 closes the loading gates 118 and 128–134 of those registers and also closes gate 146 so that no further shift pulses are supplied to registers 138 and 140.

The 1-output of FF–150 enables gate 152 to pass the next occurring RP–3 pulse, which represents the beginning of a quadrant on the drum 10. This pulse sets FF–154 to enable gate 156 which, in turn, passes successive P–1 pulses (at the time rate of the drum 10) via buffer 148 as circulating shift pulses for the registers 116 and 120–126.

As explained in the aforementioned copending application, "Data Storage System," the coincidence 174 compares contents of the registers 116 and 120–126 as a group of twenty signals occurring in four groups of five successively with the corresponding groups of signals read from the drum bin 178. When full coincidence occurs, the coincidence 174 supplies a train of four P–2 signals to the gate 172. This gate 172 is enabled by the R signal (derived from FF–168, which was set via FF–154) to pass the four P–2 signals as "read-out" signals on the line 180 to control the readout operation described hereinafter. These read-out pulses are also supplied to a 3-stage binary counter 182, and a count of four therein is detected by a gate 184 which is pulsed by successive P-1 timing pulses. An output pulse from gate 184 represents the end of read-out and is supplied via a buffer to line 185 to reset FF-154, the registers 116, 120-126, and 138, and FF-136. When FF-154 is reset, counter 164 is then reset, and following four drum bit positions FF-168 is reset. This time elapse ensures read-out of a drum cell whose SIC and information bits are located on opposite sides of a quadrant marker pulse.

If coincidence is not detected by the coincidence 174 in a full drum revolution, this condition is recognized, in effect, by the counter 164 counting five quadrant pulses (RP-2), which condition represents a full revolution of the drum 110 back to the first quadrant marker RP-2, and is detected by gate 166 to supply a pulse to line 185 and to reset FF-154. The condition indicates the possibility of an error in the SIC signals supplied by the requesting console, and this error is handled without a read-out from the drum being initiated. Since there is no read-out from the drum, a special reply message may be assembled in registers 212-216 to be handled appropriately when received by the requesting console 30 or 31. For example, another gate 189 may be used to detect the output of counter 164 that represents a full drum revolution and jam a pulse into the first and third stages of registers 212-216. The gate 189 has a third input NC from coincidence 174 which supplies an enabling signal that represents non-coincidence; this signal may be derived, for instance, from the 0-output of FF-234 in the coincidence logic (FIG. 7) of the aforementioned copending application, "Data Storage System." Thus, a pulse on line 187 represents the condition of a failure to locate the selected SIC code on the drum 10.

When FF-154 is reset, its 0-output is effective via gate 186 to reset counters 164 and 182. At that time register 140 is in reset condition, having reset by the previous P-2 pulse passed by gate 144. The circulating gates 134 are closed, and the loading gates 118 and 128-132 are enabled and ready, as is the remainder of this portion of the logic, to load the next message received from Rx 34.

Figures 3B, 5:
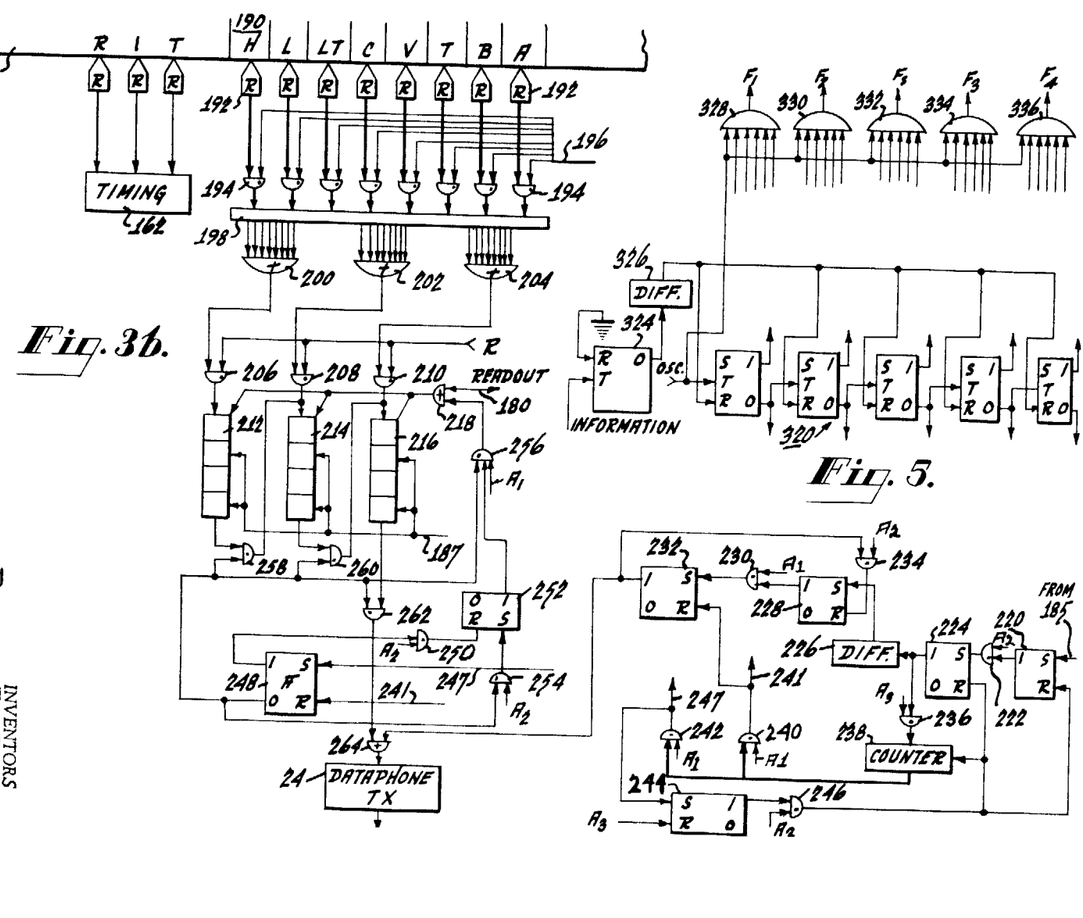
Figure 6:
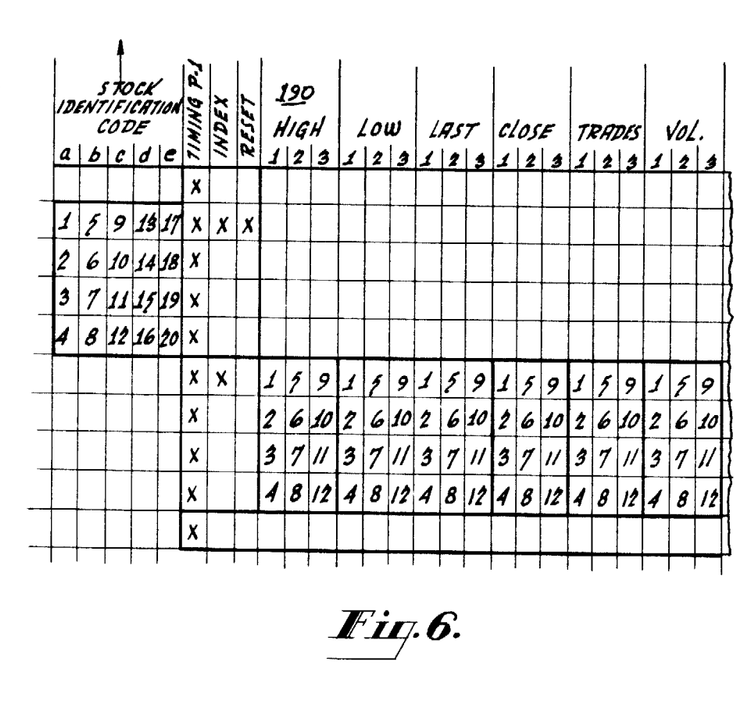
FIG. 6 is a schematic diagram showing the arrangement of information on a magnetic drum in the system of FIGS. 3a and 3b.

In FIG. 3b the information portion of the drum is shown weight eight bins respectively representing the High, Low, Last, Close, Volume, Trades, Bid, and Ask categories of information that are stored on the drum. Each of these bins 190 contains three recording tracks, as shown in FIG. 6 of the drawing, and each unit of information is made up of twelve bits stored in those three tracks within a cell of four bit positions around the periphery of the drum. The recording heads 192 each represent three individual heads respectively associated with the three tracks of each bin 190 (the single head being used diagrammatically for simplicity of illustration). The outputs of the heads 192 are supplied to read-out gates 194 (each gate 194 is actually three gates individually associated with the three heads 192 for each information bin, but again represented by a single gate symbol 194 for simplicity of representation).

In FIG. 3a, the register 138, which receives the signals representing the category of information requested, has its outputs taken at the 1-output of each stage. Those outputs are symbolically represented by a broad line 196 and are used as the second inputs to the gate 194. That is, the eight lines individually representing High, Low, Last, etc. are individually connected to the gates 194 associated with the information bins for that category of information. Thus, the three gates 194 that receive the signals from the three tracks of the High information bin 190 receive the line derived from the High stage of the register 138. The outputs of the gates 194 are shown collected in a distribution bus 198 and distributed by groups of eight lines to three buffers 200, 202, and 204. The inputs to the buffer 200 are the lines corresponding to the first tracks of each of the eight bins 190; the inputs to the buffer 202 are the lines corresponding to each of the second tracks of the bins 190; and the inputs to the buffer 204 are the lines corresponding to the third tracks of each of the bins 190.

The outputs of the buffers 200, 202, and 204 are respectively connected as inputs to gates 206, 208, and 210. The other inputs to these gates 206-210 are from the R-output of FF-168. The outputs of the gate 206 are supplied to a 4-stage shift register 212; and the outputs of the gates 208 and 210 are respectively supplied to 4-stage shift registers 214 and 216. To load the registers 212-216, shift pulses are supplied from the read-out line 180 via the buffer 218. The four read-out pulses are derived from the gate 172 upon coincidence of the SIC address being detected in the logic 174.

Assuming that the information category requested is "High" price, the corresponding line of the group 196 carries an enabling signal to open the gates 194 for the signals read from the High bin 190. The four bits in the first track are set up in register 212 via buffer 200; the second track in register 214, and the third track in register 216. Thereby, the registers 212-216 have established in them the twelve bits read from the four bit positions of the cell immediately following the SIC code with which coincidence was detected as indicated by the drum format diagram in FIG. 6. In a similar fashion, any other category of information may be read out into the registers 212-216.

The read-out from the drum 10 involves only four timing pulses which are the read-out pulses supplied on the line 180 for shifting the information into the registers 212-216. The completion of the read-out operation is recognized, as described above, by the counter 182 and gate 184 which supply a pulse to the line 185 upon the completion of the four read-out pulses. The pulse on the line 185 is used also to set FF-220, the 1-output of which is gated with an A-2 sync pulse from sync generator 114 in gate 222 to set FF-224. The leading edge of the waveform at the 1-output of FF-224 is passed by differentiator 226 to set FF-228, the 1-output of which is gated with A-1 in gate 230 to set FF-232.

The 1-output of FF-232 is gated with an A-2 sync pulse in gate 234 to reset FF-228. The 1-output of FF-224 also enables gate 236 to pass A-3 sync pulses to be counted in counter 238. This counter 238 may be a 5-stage binary counter in order to provide counts of 6 and 18, which counts are respectively detected in gates 240 and 242 with A-1 sync pulses. The appropriate pluralities of output lines from counter 238 to gates 240-242 are illustrated simply by heavier lines. The output of gate 240 is used to reset FF-232 and also also to reset FF-248 via line 241. The output of gate 242 sets FF-244 (which is reset by A-3 sync pulses), and the 1-output thereof enables gate 246 to pass A-2 sync pulses for the purpose of resetting FF-220 and -224 and counter 238.

The output 247 of gate 242 also sets FF-248, the 1-output of which enables gate 250 to pass A-2 sync pulses to reset FF-252. The 0-output of FF-248 enables gate 254 to pass A-2 pulses to set FF-252, the 1-output of which is used to enable gate 256. Gate 256 also receives A-1 timing pulses as well as the signal from the 0-output of FF-248. This connection from the 0-output of FF-248 is also used to enable unloading gates 258, 260, and 262. These gates 258-262 connect the registers 212-216 as a single serial register for unloading purposes; that is, gate 258 is connected between the fourth stage of register 212 and the first stage of register 214, gate 260 is similarly connected between registers 214 and 216, and gate 262 is connected at the output of register 216. The output of gate 262 and the 1-output of FF-232 are connected via buffer 264 to the input of Tx 24 for transmission back to the terminal switching logic.

In operation, the pulse appearing at connection 185 (FIG. 3a) marking the fourth read-out pulse and the completion of that operation is used to set FF-220, -224, –228, and –232 in sequence, and also to initiate the count in counter 238. The 1-output of FF–232, being supplied to Tx 24 initiates the transmission of a space signal representing a binary 1 immediately after the count of 1 in counter 238. This transmission continues for five timing periods (to mark the beginning of the answering message) that are effectively established by the count of A–3 sync pulses in counter 238. These sync pulses reoccur at a 1 kc. rate and determine the rate of transmission of signals to the Tx 24. The completion of the fifth timing period after the setting of FF–232 is marked by a count of 6 in counter 238, which is recognized by gate 240 to reset FF–232.

The output pulse from gate 240 is also used to initiate the unloading of the registers 212–216 by resetting FF–248, the 0-output of which enables unloading gate 262. Thereby, during the sixth timing period of the answering message, the output of the fourth stage of register 216 is passed by gate 262 to Tx 24. The 0-output of FF–248 is also applied to gate 256 and to gate 254 to set FF–252 upon the succeeding A–2 pulse and thereby complete the enabling of gate 256. Enabled gate 256 passes succeeding A–1 sync pulses via buffer 218 as shift pulses to the registers 212–216. Thereby, at the beginning of the seventh timing period of the answering message the contents of the third stage of the shift register 216 are shifted into the fourth stage thereof and supplied via gate 262 to Tx 24. This operation continues for twelve sync cycles following the resetting of FF–248 which started the unloading of registers 212–216. That is, when a count of 17 is registered in counter 238, the twelfth bit is being passed by gate 262 from register 216. Thus, when counter 238 registers a count of 18, gate 242 passes an A–1 pulse to set FF–248 and close the gates 256–262 to terminate the message to be transmitted by Tx 24.

The output of gate 242 is also used on the next cycle to reset FF–220 and –224 and counter 238 to place them in condition for the next read-out and unloading operation. When FF–232 is set at the beginning of this operation, gate 234 passes the next A–2 pulse to reset FF–228 and close gate 230. Thereby, when a pulse from gate 240 is developed to reset FF–232, there is no interference via gate 230.

The signals transmitted by Tx 24 are received by Rx 26 and converted to voltage levels suitable for application to the logic of the terminal switching 28. The output of Rx 26 is supplied to sync-pulse generator 90 for synchronization purposes, and also to the first stage of a 5-stage shift register 270. Shift pulses Fs for this register 270 are supplied by the sync-pulse generator 90, and they occur between the sync-pulses F–2 and F–3 as indicated in timing diagram 91 adjacent generator 90. The 1-outputs of the five stages of register 270 are supplied to gate 272 which is strobed by F–3 sync-pulses to set FF–274. The 1-output of FF–274 enables gate 276 to pass Fs shift pulses to the shift line 46 of console-1, and to the similar shift lines of the other consoles 31. The output of Rx 26 is also connected directly to the information line input 48 of console-1 and the similar information lines of the other consoles 31.

As shown in FIG. 4, the information line 48 for console-1 (and similarly for the other consoles 31) connects to the first stage of a 12-stage shift register 278. The shift line 46 is connected to a gate 280 enabled by the associated first line 76 of commutator 40 to supply the shift pulses Fs to the register 278. The first four stages of register 278 have their 1-outputs connected to a relay decoder 284, and the third such group to a relay decoder 286. The decoders 282–286, in turn, operate output devices 288, 290 and 292, respectively, which output devices may be a decimal character lamp display such as that described in the aforementioned copending patent application, "Data Storage System." Thus, the three numerics in binary-coded-decimal form that are respectively established in the three four-stage groups of register 278 are decoded by the decoders 282–286 and displayed. If a non-numeric or invalid code is established in one or more parts of register 278, the associated display 288–292 does not present a numeral. The code group 1010, which is jammed into registers 212–216 from line 187 upon failure to obtain a readout, is invalid for operation of the displays 288–292 through the decoders 282–286. Thus, the display would be extinguished under such circumstances to indicate a possible error in the request. In addition, provision may be made in the decoders 282–292 to recognize this code group for additional indication or control.

In FIG. 2, the shift pulses Fs passed by gate 276 are counted in counter 294; and a count of 12 registered therein enables gate 296 to pass the next F–3 pulse via buffer 302 to reset FF–274. The 0-output of the latter enables gate 298 to pass the next F–4 pulse and reset counter 294.

A 7-stage binary counter 300 receives F–1 pulses to be counted; the count of 127 in counter 300 is recognized by gate 306 and timed with an F–3 pulse to supply a pulse to buffer 302 together with the output of gate 296. The output of buffer 302 is used to set FF–86 to enable the logic for the start of transmission of another request message, and is also applied to commutator 40 to step that commutator to the next state and to enable the next console 31 for the handling of its request. The output of buffer 308 also sets FF–310 to enable gate 312 to pass F–4 pulses for resetting the counter 300.

In operation, the transmitted reply message is received by Rx 26 and established in register 270. The beginning portion of that message includes the five binary 1's that precede the transmission of the twelve bits of information. The five binary 1's are unique with the use of a numeric code for this information based on binary-coded-decimal, in that with such a code, five binary 1's in succession normally do not occur in a serial transmission. Accordingly, this unique start-of-message combination is recognized, when established in register 270, by gate 272 to set FF–274 which, in turn, opens gate 276 to pass shift pulses for the entry of the information into the console (FIG. 4). The information is returned to the console that requested it and is there displayed. The operator of the console has a display of information corresponding to the requested stock and category of information, as all continue to be registered on the selector switches of that console.

After the twelve bits of information are read into the console, this condition is recognized by a corresponding count in the counter 294 to which the shift pulses are applied. At that time, the commutator 40 is stepped to enable the request of the next console 31 to be transmitted in the manner described above and also to set FF–86 to initiate the logic for handling the transmission of the requesting message. At this time also, FF–274 is reset as is counter 294. Also, FF–310 is set to reset counter 300. Accordingly, the logic is restored to a condition for receipt of the next reply message.

If a reply message is not received by Rx 26 within a certain time after the initiation of the request via Tx 32, this condition is recognized, and the logic of the terminal equipment handled accordingly. That is, counter 300 starts to receive F–1 pulses to be counted immediately after being reset, which is essentially at the time that the beginning of the next requesting message is transmitted by FF–82 and Tx 32. If counter 300 counts to 127, gate 306 is enabled to pass the next F–3 sync-pulse via buffer 302 to step commutator 40 and set FF–86 to initiate the request of the next console as described above. This count of 127 in counter 300 permits the elapse of sufficient time for requesting messages to be filled; that is, it is greater than the total of the time of transmission of the 27-bit requesting message via Tx 32, the time of transmission of the reply 17-bit message via Rx 26, and the time for a full revolution of drum 10

(which is the maximum time required for locating the desired information on the drum). This drum access time may be assumed to be of the order of 50 milliseconds. Thus, with a transmission rate of 1 kilocycle via Tx 32 and Rx 26, a request should be filled in about 0.1 second, and the count of 127 milliseconds in counter 300 represents more than ample time for a proper requesting message to be transmitted, filled, and the reply transmitted. Accordingly, upon the elapse of this time, if a reply message has not been received and processed (as indicated by the operation of counter 294) an error is indicated, perhaps in the original requesting message, and the logic is actuated to handle the request of the next console. The output pulse from the counter 300 may also be suitably directed to the requesting console (under the control of the commutator 40 just before it is stepped, by delaying the application of that pulse to buffer 302 for a sync-pulse cycle) as a control or warning signal to indicate that the request was not filled.

The arrangement of counters 294 and 300 provide alternative controls for initiating the sending of the next requesting message. Counter 294 provides asynchronous control of the stepping of commutator 40 and the setting of FF–86, and counter 300 provides synchronous control. Counter 300 may be dispensed with if the check is not desired on the possible failure to receive a reply message; however, in that case, an arrangement is made to provide a setting pulse for FF–86 to initiate machine operation. Also, counter 294 may be dispensed with and counter 300 retained for only synchronous operation of the message cycle; in which case FF–310 is not needed.

The overall operation starts with the setting of FF–86 and –82 to generate the two binary 1's that mark the start of a requesting message as it is supplied to Tx 32. Counter 92 counts the two intervals for these binary 1's and then shifts control over to FF–96, which immediately initiates the transfer of the requesting message from one of the consoles 30 or 31 (as determined by the setting of commutator 40) to Tx 32. Upon completion of the transfer of the requesting message from the console, gate 108 recognizes the corresponding condition of commutators 42 and 44 to reset the control logic therefor.

The requesting message is established via Rx 34, in the registers 140, 138, 126, 124, 122, 120, 116 all of which were previously reset and which were arranged for loading by reset FF–136. When the register 140 contains the two binary 1's that mark the start of the message, FF–136 is set to switch the registers 116 and 120–126 for circulation. Thereby, the desired SIC code is located in the drum 10 by means of coincidence logic 174, and four readout pulses are generated on line 180.

Only one of the stages of register 138 contains a binary 1 which represents the category of information to be supplied; let us say stage H, representing High price. The output of stage H, via lines 196, enables the gates 194 for the High bin 190 of drum 10; and the three outputs of those gates 194 are passed via buffers 200, 202 and 204, respectively (and via distribution bus 198) and gates 206, 208 and 210 during the time interval of R, that is when FF–168 is set (corresponding to the period during which SIC is being located and thereafter for a drum revolution period of a four-bit cell during which readout actually takes place).

The twelve information bits are read out and into the registers 212, 214, 216 in three parallel groups of four bits under the control of the readout pulses on line 180. Upon completion of this readout, counter 182 supplies a pulse to line 185 marking the end of readout and initiating the formation of the reply message.

The pulse on line 185 sets FF–220 and, thereby, FF–232 to supply a binary 1 or space signal via buffer 264 to Tx 24. Five such space signals are generated under control of counter 238 and gate 240, which terminates this activity by resetting FF–232. At the same time, gate 240 resets FF–248 to initiate the unloading of registers 212–216 via gates 258–262 and buffer 264 to Tx 24 as a serial reply message. When the registers 212–216 are unloaded, the counter 238 registers a count of 18 that enables gate 242 to set FF–248 and terminate the unloading operation and otherwise reset the associated control logic.

The reply message received by Rx is directed to register 270, and, when the first five binary 1's marking the start of the reply message are established therein, gate 272 is enabled, as is gate 276. The shift pulses Fs are directed to the console shift register 278 (FIG. 4) to load the twelve information bits of the reply message therein for operation of the display devices. The counter 294 terminates the supply of shift pulses, Fs when the reply message is loaded and initiates the sending of the next requesting message. Alternatively, the counter 300 registers the time elapsed since the requesting message was sent; and, if no reply is received within an appropriate time, the sending of the next requesting message is initiated by setting FF–86 and stepping commutator 40. The operation is then repeated in the manner described.

Although the information changes in the console output register 278 during the transitions caused by shifting between stage and by the replacement of the shift register contents, these transitional conditions do not affect the display devices 288–292. The conditions of the display devices, that is the decimal numerals that are displayed, change only when the information to be displayed changes; this is a consequence of the relative time constants of the different parts of the system. The relays of decoders 282–286 have a time response of the order of many milliseconds, say about twenty milliseconds, for switching from one operating state to the other. The signal transients in the stages of the shift register 278 are of the order of microseconds, and, of course, do not affect these relays. The time involved in shifting out the information stored in the register 278 and refilling it with the same or different information is the transmission time of the twelve bits of information, that is, twelve milliseconds at the 1 kc. rate that has been assumed. The relay response time, that is the time needed to actuate or to release a relay, is therefore substantially greater than the loading time of the shift register 278. Accordingly, the displayed numerals are not changed within that loading time.

The time for running through a cycle of commutator 40 is less than 1 second to handle the requests of the eight consoles 30 and 31 provided for in the system of FIG. 2. Therefore, any request established by the switches 54 and 56 of the console will be processed repeatedly, as long as they remain unchanged, by the equipment about every second. Although the energization of the decoder relays is momentarily varied as the register 278 is emptied and refilled, the variation occurs for so short a time that the relays remain substantially unaffected, and the display indicators 288–292 continue to present the same information. There is no flickering or momentary interruption of the display. If the response time of a relay were too small to attain the aforementioned operation, it may be increased by the addition of a shunt capacitor or other time delay circuit.

Upon a change in the settings of switches 54 and 56 in the console, the information of the new request is displayed within the cycle time of the commutator 40, which may be of the order of one second, or less. Thus, the operator's request is met essentially within the operator's own response time.

In FIG. 5, a schematic logic diagram is shown of a synchronizer that may be used for the synchronizer generator 90 in FIG. 2. This synchronizer includes a 5-stage binary counter 320 which counts pulses received from the crystal oscillator 322 (FIG. 2), which are supplied accurately at a 32 kc. rate. Thus, with this input rate, the counter 320 has a counting cycle rate of 1 kc. Another counter stage, or triggerable flip-flop, 324 receives at its trigger input the information pulses developed by Rx 26, and its reset input is returned to a resetting voltage represented by the conventional ground symbol. With this arrangement, the flip-flop 324 is triggered by an information pulse and immediately resets upon termination thereof. Changes in the 0-output of the input stage 324 are shaped by a differentiator 326 and applied to the reset inputs of the stages of counter 320. The 1- and 0-outputs of the counter stages are connected combinatorily to five gates 328–336, the outputs of which supply the synchronizer pulses F–1, F–2, Fs, F–3 and F–4. The oscillator pulses are also supplied as inputs to each of the gates 328–336.

Upon a transition in the information signals going from a mark to a space, the input stage 324 is triggered and reset and the 0-output signal via differentiator 326 resets the counter 320. Thus, the counting cycle (which is a count of 32 oscillator pulses supplied at a 32 kc. rate) is essentially at the same 1 kc. rate as the information pulses supplied to the input stage 324 from Rx 26. Accordingly, the counting cycle is synchronized to the information rate to within a pulse from the oscillator 322. The gates 328–336 are connected to produce outputs at the counts of 0, 8, 15, 20, and 28, respectively, so that synchronizer pulses are supplied to the lines F–1, F–2, Fs, F–3, and F–4 at the corresponding times in the counting cycle. The synchronizer 114 is similarly constructed for purposes of generating pulses A–1 to A–3, though at somewhat different cycle times. Suitable logic for generating Ps shift pulses is described in connection with the aforementioned copending application "Information Storage System" (FIG. 6).

The synchronizer generator 90, for purposes of generating the syns-pulses F–1 to F–4 and Fs, is jointly under the control of the pulses from oscillator 322 and the information signals received and generated by Rx 26. The synchronizer generator 1114, for purposes of generating the sync-pulses A–1 to A–3, is jointly under the control of oscillator 179 and the signals received and generated by Rx 34. In addition, the synchronizer generator 114 receives timing pulses from the timing generator 162 in order to develop the Ps shift pulses (at time P–3) that are supplied to gate 146 for loading the registers 116, 120–126, 138, and 140. These Ps shift pulses are generated at a 1 kc. rate substantially in the middle of each information pulse time interval and in synchronism with the timing of the drum 10.

The inter-relationships of the logic in the data retriever (FIGS. 3a and 3b) and the logic in the terminal switching (FIG. 2) may be appreciated by noting that the synchronizer generator 114 is synchronized to the requesting message being transmitted by Tx 32 and, thus, is essentially synchronized to generator 90. That is, the F–1 to F–4 pulses determine the timing of the requesting message, and transitions in that message from mark to space are used to reset the counter in synchronizer generator 114. Consequently, during the transmission of the requesting message, the synchronizer 114 is synchronized to the synchronizing generator to within 1/32 of the transmission time interval, that is, to within the interval of a pulse from the oscillator 179. The operation of the control logic for receiving and processing the requesting message is generally under control of the timing generator 162, and the synchronization of transition from the receipt of the requesting message to its processing is coordinated by the Ps shift pulses generated by the synchronizer 114.

When the reply message is being formed and transmitted by Tx 24, the synchronizer generator 114 is operating essentially independently, and the synchronizer 90 is timed to the information pulses received by Rx 26. Thereby, the synchronizer 90 is timed to synchronizer 114 to within 1/32 of the information transmission cycle. Thus, effectively, as long as messages are being transmitted in one direction or the other, the synchronizers 90 and 114 and essentially synchronized to each other to within an oscillator pulse. As long as the information is being transmitted, the equipments are synchronized to each other, the receiver being synchronized to the transmitter.

During times of quiescence, when no information is being transmitted, any drift from synchronization is not important since it does not affect any information, and the generators 90 and 114 are immediately synchronized upon transmission of a message.

With this invention, a large number of individual consoles 30 and 31 may be effectively connected to a single memory containing a large store of current stock information. The data retrievers 20 and 22 may all be connected directly to the memory 10 directly so that one console associated with each data retriever may be served at the same time, and may be remotely connected. A large number of data retrievers may be connected to the memory 10 in the same way, the limitations being essentially those due to the amplification made available with the drum recording heads 176 and 192 and the transmission line arrangements that are provided. Also, consoles 16 in the vicinity of memory 10 may be connected more directly to it via a simpler form of data retriever shown as the ouput logic 18 in FIG. 1. Thus, data retrieval system can supply a large quantity of current information on stock transactions to a large number of operators substantially simultaneously and operating from near or remote locations.

We claim:
1. A data retrieval system which comprises
    (a) a cyclic memory for storing data,
    (b) display units each including means for producing request signals, means for receiving replies thereto and means for displaying said replies,
    (c) terminal means having a plurality of said display units connected thereto,
    (d) data retrieving means,
    (e) communication means connecting said data retrieving means and said terminal means for transmission in both directions therebetween,
    (f) said terminal means including means for receiving request signals from said display units and means for transmitting corresponding request messages to said data retrieving means,
    (g) said data retrieving means including means responsive to a request message for obtaining the requested data from said memory and means for transmitting a corresponding reply message to said terminal means,
    (h) means at said terminal means for supplying reply data in said reply message to the requesting display unit,
    (i) and sequencing means for establishing successive intervals for the transmission of requests of respective display units and the supplying of replies thereto in a predetermined sequence,
    (j) said intervals being at least as long as the time required for the transmission of a request of the respective display unit and the supplying of a reply thereto.

2. A system in accordance with claim 1 including a plurailty of said data retriever means connected to said memory for simultaneous access to data therein, a plurality of said terminal means connected to said plurality of data retriever means respectively by respective communication means, and a plurality of display units connected to each of said terminal means.

3. A system in accordance with claim 1 in which a display unit stores digit signals of a coded request signal.

4. A system in accordance with claim 1 in which a display unit stores digit signals of a coded request signal and said terminal means includes means for utilizing said stored digit signals to transmit correspondingly coded request messages and supply replies thereto repeatedly during the sequential intervals of that display unit.

5. A system in accordance with claim 1 including means at said terminal means and at said data retrieving means for producing predetermined bit patterns at the beginning of said request and reply messages respectively, means at said data retrieving means for recognizing said bit pattern in a request message and responsive to such recognition for initiating the obtaining of the requested data from the memory, and means at said terminal means for recognizing said bit pattern in a reply message and responsive to such recognition for initiating the supply of the reply data to a display unit.

6. A system in accordance with claim 1 in which said request and reply messages are digital messages, and including pulse generators at said terminal means and at said data retrieving means, respectively, for generating pulses at similar rates, means at said data retrieving means and at said terminal means for utilizing the digital signals in said request and reply messages, respectively, to synchronize the respective pulse generators, storage means at said data retrieving means and at said terminal means for receiving said digital request and reply messages respectively, and means at said data retrieving means and at said terminal means for utilizing the pulses from the respective pulse generators to control the storing of said messages in the respective receiving storage means and to control the transmission bit rate of the respective reply and request messages.

7. A system in accordance with claim 1 in which data in said cyclic memory is stored in a plurality of tracks, and said data retrieving means includes a storage register, means for supplying the data in said plurality of tracks to said storage register, and means for shifting out the data in said storage register for said reply message.

8. A data retrieval system which comprises
(a) a cyclic memory for storing data,
(b) display units each including means for producing request signals for desired data, means for receiving replies thereto and means for displaying said replies,
(c) terminal means having a plurality of said display units connected thereto,
(d) data retrieving means,
(e) communication means connecting said data retrieving means and said terminal means for transmissions in both directions therebetween,
(f) said terminal means including means for receiving request signals from said display units and means for transmitting corresponding request messages to said data retrieving means,
(g) said data retrieving means including means responsive to a request message for obtaining the requested data from said memory and means for transmitting a corresponding reply message to said terminal means,
(h) means at said terminal means for supplying reply data in said reply message to the requesting display unit,
(i) sequencing means for establishing successive intervals for the transmission of requests of said display units in a predetermined sequence and the supplying of replies thereto,
(j) and means responsive to the receipt of a reply message at said terminal means for actuating said sequencing means to the next display unit in said sequence.

9. A system in accordance with claim 8 including means operating in the absence of a reply message for actuating said sequencing means to the next display unit after a predetermined interval from the actuation to the preceding unit, said interval being greater than the maximum interval required for the transmission of a request from the preceding unit and the supply of a reply thereto.

10. A stock information retrieval system which comprises
(a) a cyclic memory for storing a plurality of categories of coded information concerning stocks and associated coded multi-character identifications of the respective stocks,
(b) display units each having means for producing request signals including said coded multi-character stock identification signals and desired category signals,
(c) terminal means having a plurality of said display units connected thereto,
(d) data retrieving means,
(e) communication means connecting said data retrieving means and said terminal means for transmission in both directions therebetween,
(f) said terminal means including means for receiving request signals from said display units and means for transmitting corresponding coded request messages to said data retrieving means successively in a predetermined sequence,
(g) means at said data retrieving means responsive to a request message for obtaining information from said memory corresponding to the stock identification and category in the request,
(h) means at the data retrieving means for transmitting the obtained information in a coded reply message to said terminal means,
(i) means at said terminal means for supplying information in said reply message to the requesting display unit,
(j) each of said display units including means for receiving and means for displaying the information supplied thereto,
(k) and means responsive to the receipt of a reply message at said terminal means for enabling the transmission of a request from the next display unit in said sequence.

11. A system in accordance with claim 10 including means operating in the absence of a reply message for enabling the transmission of a request from a succeeding display unit after a predetermined interval from the enabling of the preceding display unit, said predetermined interval being greater than the maximum interval required for the transmission of a request from the preceding display unit and the supply of a reply thereto.

12. A system in accordance with claim 10 in which said display units store digit signals of the multi-character stock identification and category signals of their respective request signals, and said terminal means includes means for utilizing said stored signals to generate said resquest messages.

13. A system in accordance with claim 10 including pulse generators at said terminal means and at said data retrieving means, respectively, for generating pulses at similar rates, means for utilizing the pulses from said pulse generators to produce predetermined recognition bit patterns at the beginning of said request and reply messages respectively, means at said data retrieving means for recognizing said bit pattern in a request message and responsive to such recognition for initiating the obtaining of the requested information from the memory, and means at said terminal means for recognizing said bit pattern in a reply message and responsive to such recognition for initiating the supply of the reply information to a display unit.

14. A system in accordance with claim 13 including means at said data retrieving means and at said terminal means for utilizing the pulses from the respective pulse generators to control the transmission bit rate of the respective reply and request messages.

15. A system in accordance with claim 10 in which said data retrieving means includes a storage means for receiving the request messages one at a time, means including a coincidence circuit for comparing the request in said storage means with the information stored in said cyclic memory and obtaining information therefrom, an output storage means for receiving said information, and means for unloading the information in said output storage means to form information for said reply message.

16. A system in accordance with claim 10 in which said cyclic memory is a magnetic drum and said plurality of categories of information and said multi-character identifications are stored in a plurality of parellel tracks thereon, individual read heads for said tracks, individual amplifiers for said read heads, a plurality of said data retriever means connected to the outputs of said amplifiers for simultaneous access to the identification and category information in said memory, a plurality of said terminal means connected to said plurality of data retriever means respectively by respective communication means, and a plurality of said display units connected to each of said terminal means.

References Cited by the Examiner

UNITED STATES PATENTS

| | | | |
|---|---|---|---|
| 2,515,387 | 7/1950 | Alto | 340—152 |
| 2,905,760 | 9/1959 | Walker et al. | |
| 3,133,268 | 5/1964 | Avakian et al. | 340—152 |

NEIL C. READ, *Primary Examiner.*

P. XIARHOS, *Assistant Examiner.*